United States Patent
Toda

(10) Patent No.: US 7,014,345 B2
(45) Date of Patent: Mar. 21, 2006

(54) AUTO-LEVELING SYSTEM FOR VEHICLE HEADLAMP

(75) Inventor: Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 82 days.

(21) Appl. No.: 10/411,174

(22) Filed: Apr. 10, 2003

(65) Prior Publication Data

US 2003/0193812 A1 Oct. 16, 2003

(30) Foreign Application Priority Data

Apr. 12, 2002 (JP) ............................ P.2002-110304

(51) Int. Cl.
*B60Q 1/08* (2006.01)

(52) U.S. Cl. ...................... 362/464; 362/460; 362/465; 362/466

(58) Field of Classification Search ............... 362/276, 362/464, 465, 467, 460, 466; 315/82
See application file for complete search history.

(56) References Cited

U.S. PATENT DOCUMENTS

| 5,030,884 | A | 7/1991 | Roussey et al. | |
| 6,229,263 | B1 | 5/2001 | Izawa | |
| 6,281,632 | B1 * | 8/2001 | Stam et al. | 315/82 |
| 6,305,823 | B1 | 10/2001 | Toda et al. | |
| 6,332,698 | B1 | 12/2001 | Toda et al. | |
| 6,445,085 | B1 * | 9/2002 | Toda et al. | 307/10.8 |
| 6,456,194 | B1 * | 9/2002 | Carlson et al. | 340/440 |
| 6,693,380 | B1 * | 2/2004 | Toda et al. | 315/82 |
| 6,817,741 | B1 * | 11/2004 | Toda et al. | 362/466 |

FOREIGN PATENT DOCUMENTS

| DE | 43 11 669 A1 | 10/1994 |
| DE | 195 25 981 A1 | 1/1997 |
| DE | 19944289 | 4/2000 |
| DE | 199 46 297 A1 | 4/2001 |
| DE | 199 56 456 A1 | 5/2001 |
| DE | 100 09 590 A1 | 8/2001 |
| JP | 09-290683 | 11/1997 |
| JP | 09-301055 | 11/1997 |
| JP | 2000-103280 | 4/2000 |
| JP | 2001-191841 | 7/2001 |

* cited by examiner

*Primary Examiner*—Sandra O'Shea
*Assistant Examiner*—Anabel Ton
(74) *Attorney, Agent, or Firm*—Fish & Richardson P.C.

(57) ABSTRACT

A auto-leveling system for vehicle headlamp comprises a headlamp an optical axis L of which is tilted vertically by a drive of a motor, a control unit 16 for controlling the drive of the motor 10, a vehicle pitch angle sensing means 14, and a headlamp lighting switch 11, whereby the control unit 16 controls the drive of the motor 10 based on a sensed pitch angle such that the optical axis of the headlamp is always set to a predetermined tilted state with respect to a road surface when the headlamp lighting switch is in an ON state, wherein the system has a daytime running light lighting deciding function, and the control unit 16 controls the drive of the motor 10 so as to fix the optical axis L of the headlamp at a frontal lower limit position when the headlamp lighting switch 11 is in an OFF state and a daytime running light is turned on. Thus, the drive of the motor 10 in a daytime running is eliminated and a load applied to the motor 10 is reduced.

3 Claims, 2 Drawing Sheets

AUTO-LEVELING SYSTEM FOR VEHICLE HEADLAMP

BACKGROUND OF THE INVENTION

The present invention relates to an auto-leveling system for vehicle headlamp that tilts and adjusts automatically an optical axis of a headlamp based on an inclination of a vehicle in the longitudinal direction (referred to as a "pitch angle" hereinafter) in the direction to offset the inclination by an angle equivalent to on the pitch angle (referred to as an "auto-leveling" hereinafter) and, more particularly, a auto-leveling system for vehicle headlamp that is effective for the vehicle equipped with a daytime running light that is turned on even in the daytime to inform other running vehicle and the walker that such vehicle is running.

In the headlamp of this type, for example, a reflector to which a light source is fitted is supported on a lamp body tiltably round a horizontal tilt axis, and also an optical axis of the reflector (headlamp) can be tilted round the horizontal tilt axis by the actuator.

Then, the conventional auto-leveling system is constructed by providing the control portion that controls a drive of the actuator based on sensed signals of a pitch angle sensing means, a peed sensor, etc. to the vehicle. The control portion adjusts the optical axis of the reflector such that the optical axis of the reflector is always set in a predetermined state with respect to the road surface (auto-leveling) when a headlamp lighting switch is in its ON state.

However, in some countries in North America and Northern Europe, the law obligates to equip the daytime running light, which is turned on even in the daytime to inform other running vehicle and the walker that such vehicle is running, as one means of the measure for safety. Then, as modes of the daytime running light, there are the case where a dipped beam of the headlamp is utilized and the case where a main beam that is dimmed not to form a glare light is utilized. In both cases, the headlamp is caused to turn on.

Hence, if the conventional auto-leveling system, which is applied to the daytime running light unequipped vehicle, is applied to the daytime running light equipped vehicle as it is, the auto-leveling system that should not be operated is also operated since the headlamp is turned on (a headlamp lighting switch is set to its ON state) even in the daytime. As a result, because an operating frequency of an actuator is increased, an amount of power consumption is increased and also a lifetime of the actuator is shortened in contrast to the daytime running light unequipped vehicle. It is of course that, if a motor with great durability is employed, the lifetime of the actuator is lengthened. But there is caused such problems that the motor is large in size and expensive and also the headlamp is increased in size.

SUMMARY OF THE INVENTION

The present invention has been made in view of the above problems in the prior art, and it is an object of the present invention to provide a auto-leveling system for vehicle headlamp equipped with a daytime running light that can be employed inexpensively for a long term by reducing a driving frequency of an actuator used to adjust a headlamp optical axis.

In order to achieve the above object, a auto-leveling system for vehicle headlamp according to first aspect of the invention, comprises: a headlamp an optical axis of which is tilted vertically to a vehicle body by driving an actuator; a control unit for controlling a drive of the actuator; a pitch angle sensing means for sensing a pitch angle of a vehicle; and a headlamp lighting switch, whereby the control unit controls a drive of the actuator based on the pitch angle being sensed by the pitch angle sensing means such that the optical axis of the headlamp is always set to a predetermined tilted state with respect to a road surface when the headlamp lighting switch is in an ON state; wherein the system has a daytime running light lighting deciding function, and the control unit controls the drive of the actuator so as to fix the optical axis of the headlamp at a frontal lower limit position when the headlamp lighting switch is in an OFF state and a daytime running light is turned on.

According to the first aspect of the invention, in the nighttime, since the headlight lighting switch is turned ON, the auto-leveling system is operated, i.e., the actuator for tilting and adjusting the optical axis of the headlamp is driven, and thus the optical axis of the headlamp is automatically adjusted at an appropriate position that has a predetermined inclination state with respect to the road surface. Also, as the modes of the daytime running light, there are the case where the meeting beam of the headlamp is utilized and the case where the main beam that is dimmed to prevent the glare light is utilized. In both cases, the headlamp is caused to turn on. In contrast, in the daytime, since the headlight lighting switch is turned OFF but the daytime running light is turned on, the auto-leveling system is operated. However, after the actuator is driven initially to set the optical axis of the headlamp at the frontal lower limit position, the actuator is never driven as far as the daytime running light is kept in its turning-on state. In this case, even though the optical axis of the headlamp is fixed at the frontal lower limit position, other running vehicle and the walker can recognize that (the headlamp as) the daytime running light is turned on and also there is no possibility that the frontal visibility of the vehicle for the driver is lowered because of the daytime.

According to the second aspect of the invention, a auto-leveling system for vehicle headlamp comprises: a headlamp an optical axis of which is tilted vertically to a vehicle body by driving an actuator; a control unit for controlling a drive of the actuator; a speed sensing means for sensing a speed of a vehicle; a pitch angle sensing means for sensing a pitch angle of the vehicle; and a headlamp lighting switch, whereby the control unit controls a drive of the actuator based on the pitch angle being sensed by the pitch angle sensing means independently of whether or not a posture of the vehicle is stabilized statically such that the optical axis of the headlamp is always set to a predetermined tilted state with respect to a road surface when the headlamp lighting switch is in an ON state; wherein the system has a daytime running light lighting deciding function and is constructed to alternatively select a dynamic auto-leveling process, which executes a drive control of the actuator independently of whether or not the posture of the vehicle is stabilized statically, and a static auto-leveling process, which executes the drive control of the actuator as far as the posture of the vehicle is stabilized statically, or the like, as an auto-leveling process, and also the control unit is constructed to select the dynamic auto-leveling process when the headlamp light switch is in an ON state, and select the static auto-leveling process when the headlamp light switch is in an OFF state and a daytime running light is turned on.

According to the second aspect of the invention, in the nighttime, since the headlight lighting switch is turned ON, the dynamic auto-leveling process is executed, and thus the optical axis of the headlamp is adjusted in real time at the appropriate position. Also, as the modes of the daytime running light, there are the case where the meeting beam of the headlamp is utilized and the case where the main beam that is dimmed to prevent the glare light is utilized. In both cases, the headlamp is caused to turn on. In contrast, in the daytime, since the headlight lighting switch is turned OFF but the daytime running light is turned on, the static auto-leveling process is executed and thus the optical axis of the headlamp is adjusted at the appropriate position as far as the posture of the vehicle is stabilized statically. In other words, in the conventional auto-leveling system, the dynamic auto-leveling process is executed at the high driving frequency of the actuator during when the daytime running light is turned on. On the contrary, in the case of the invention, the static auto-leveling process in which the drive of the actuator is limited in the stable posture of the vehicle and thus the driving frequency of the actuator is reduced overwhelmingly is executed during when the daytime running light is turned on.

DETAILED DESCRIPTION OF THE PREFERRED EMBODIMENTS

Next, embodiments of the present invention will be explained with reference to examples hereinafter.

Figure 1:
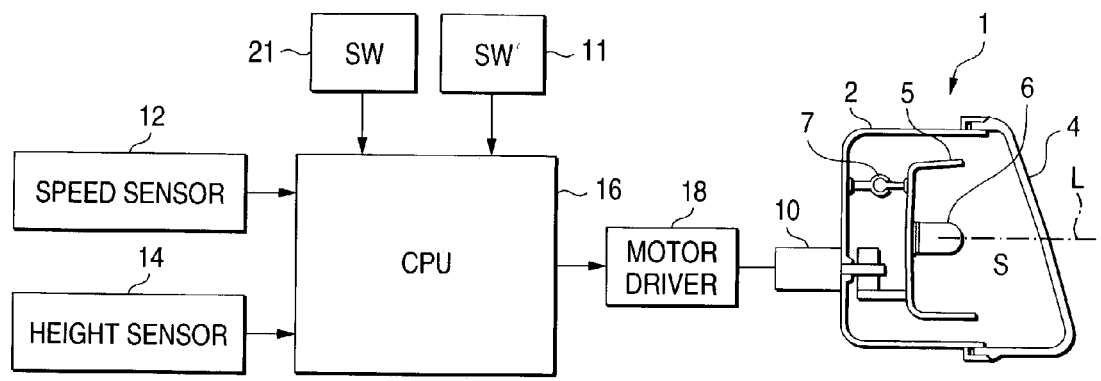
FIG. 1 is a view showing an overall configuration of a auto-leveling system for vehicle headlamp as a first embodiment of the present invention.
Figure 2:
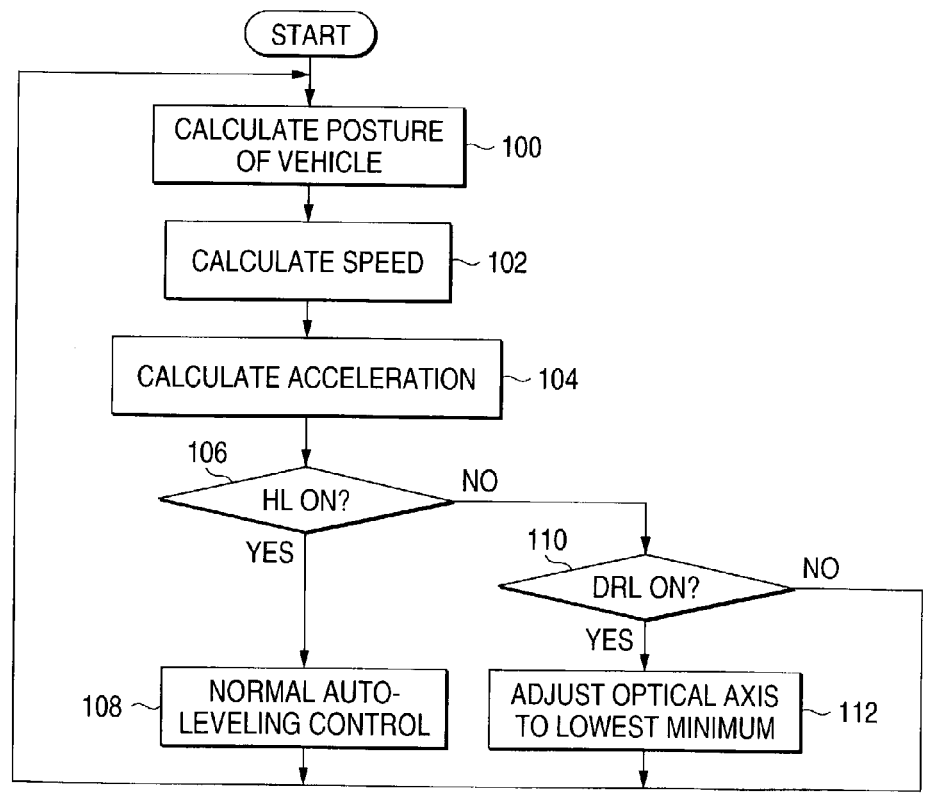
FIG. 2 is a flowchart showing controlling procedures of the same system.

FIG. 1 and FIG. 2 show a first embodiment of the present invention. FIG. 1 is a view showing an overall configuration of an auto-leveling system for vehicle headlamp as a first embodiment of the present invention. FIG. 2 is a flowchart showing controlling procedures of the same system.

In FIG. 1, a symbol 1 is a vehicle headlamp 1. A front lens 4 is fitted to a front opening portion of a lamp body 2 to constitute a lamp space S. A reflector 5 having a paraboloidal shape, to which a bulb 6 as a light source is fitted, is supported in the lamp space S to tilt round a horizontal tilt axis (an axis perpendicular to a surface of the sheet in FIG. 1) 7. Also, the reflector 5 can be tilted and adjusted by a drive motor 10 as an actuator.

The headlamp 1 is lightened on by a headlamp lighting switch 11, and a dipped beam and a main beam can be switched alternatively. Also, a daytime running light DRL is constructed by the dipped beam or the main beam that is dimmed to prevent the glare light in the headlamp 1. The daytime running light DRL is turned on by a dedicated daytime running light lighting switch 21.

Then, an auto-leveling system of the headlamp 1 is constructed mainly by the motor 10 as the actuator that tilts and adjusts an optical axis L of the headlamp 1 vertically, the lighting switch 11 of the headlamp 1, the daytime running light lighting switch 21, a speed sensor 12 as a speed sensing means that senses a speed of the vehicle, a height sensor 14 constituting a part of a pitch angle sensing means of the vehicle, and a CPU 16 as a control unit calculates the speed of the vehicle and the pitch angle of the vehicle based on signals from the speed sensor 12 and the height sensor 14, discriminates ON and OFF of the headlamp land the daytime running light DRL, and outputs a control signal to a motor driver 18 to drive the motor 10 in compliance with the conditions that are set previously. In this case, the CPU 16 has a memory portion that stores calculated pitch angle data of the vehicle, etc.

When a signal is input into the CPU 16 from the height sensor 14, the CPU 16 calculates an inclination of the vehicle in the longitudinal direction (pitch angle) based on this signal that corresponds to an amount of displacement of the suspension. In this case, the pitch angle of the vehicle can be calculated based on amounts of change in front and rear heights of the vehicle and a wheel-base distance of the vehicle in the case of two sensor system that the height sensor is provided to both the front wheel and the rear wheel, while the pitch angle of the vehicle can be guessed based on an amount of change in height in the case of one sensor system that the height sensor is provided to the front wheel or the rear wheel only. Then, the CPU 16 outputs a signal to the motor driver 18 to tilt the optical axis L by a predetermined amount in the direction to offset this pitch angle.

Also, when a signal is input into the CPU 16 from the speed sensor 12, the CPU 16 calculates the speed and acceleration of the vehicle based on this input signal. Then, in the case of the static auto-leveling specification, the CPU 16 decides whether or not the vehicle is stabilized statically (for example, whether or not the vehicle is in the constant-speed running state or the stoppage state in which the speed and acceleration are not changed over a predetermined time period), and then outputs a signal to the motor driver 18 to tilt the optical axis L as far as the vehicle is stabilized statically. While, in the case of the dynamic auto-leveling specification, the CPU 16 outputs a signal to the motor driver 18 to tilt the optical axis L whether the vehicle is stabilized statically or not.

Here, the static auto-leveling process is such a auto-leveling process that decides whether or not the vehicle is stabilized statically (for example, whether or not the vehicle is in the constant-speed running state or the stoppage state in which the speed and acceleration are not changed over a predetermined time period), and tilts and adjusts the optical axis L by driving the motor as far as the vehicle is stabilized statically. Various particular methods have been proposed in JP-A-2000-103280, JP-A-2001-191841, etc. as the well-known method in the prior art. On the contrary, the dynamic auto-leveling process is such an auto-leveling process that always tilts and adjusts the optical axis L in real time by driving the motor regardless of the static stability in contrast to the static auto-leveling process that is limited in the time of static stability of the vehicle. Various particular methods have been proposed in JP-A-9-290683, JP-A-9-301055, etc. as the well-known method in the prior art. In this case, in the case of the dynamic auto-leveling, since the driving frequency of the motor is increased rather than the static auto-leveling, the durability of the motor is considered in comparison with the motor that corresponds to the static auto-leveling.

Next, drive control of the motor 10 executed by the CPU 16 as the control unit will be explained with reference to the flowchart shown in FIG. 2 hereunder.

First, in step 100, a pitch angle of the vehicle is calculated based on the signal from the height sensor 14, and then an amount of drive control of the motor 10 is calculated from this pitch angle. Then, in step 102, a speed of the vehicle is calculated based on the signal from the speed sensor 12. Then, in step 104, an acceleration is calculated based on the speed of the vehicle. Then, the process goes to step 106.

Then, in step 106, it is decided based on the signal from the headlamp lighting switch 11 whether or not the headlamp is turned on. If YES (the headlamp lighting switch is in its ON state), the process goes to step 108. In step 108, the auto-leveling process that is set in the CPU 16 (the static auto-leveling process or the dynamic auto-leveling process) is executed. Then, the process goes back to step 100.

In contrast, in step 106, if NO (the headlamp lighting switch is in its OFF state), the process goes to step 110. In step 110, it is decided based on the signal from the daytime running light lighting switch 21 whether or not the daytime running light DRL is turned on. Then, if YES (the daytime running light lighting switch is in its ON state), a control signal for setting the headlamp optical axis to a frontal lower limit position is output to the motor driver 18 in step 112. Then, the process goes back to step 100. In this case, in step 112, the motor 10 that receives the control signal via the motor driver 18 is driven and then the optical axis L of the headlamp 1 is directed to the lowest position (the lower limit position that is set previously). Subsequent to this, the motor 10 is not driven unless this is reset, and thus the optical axis L of the headlamp 1 is fixed/held at the lowermost position. In this case, the optical axis L of the headlamp 1 is fixed/held at the frontal lower limit position at this time, nevertheless other running vehicle and the walker can recognize that (the headlamp as) the daytime running light DRL is turned on and also there is no possibility that the frontal visibility of the vehicle for the driver is lowered because of the daytime.

In contrast, in step 110, if NO (the daytime running light lighting switch is in its OFF state), the process goes back to step 100 to skip step 112.

Figure 3:
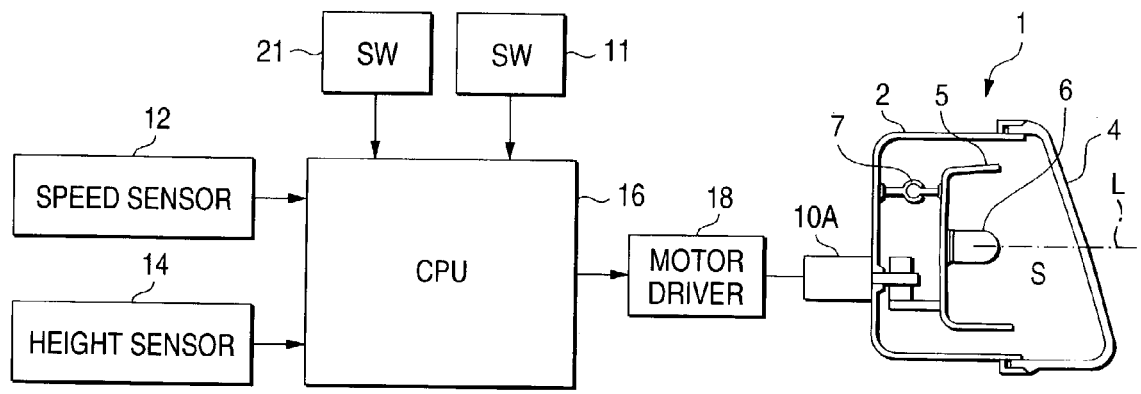
FIG. 3 is a view showing an overall configuration of a auto-leveling system for vehicle headlamp as a second embodiment of the present invention.
Figure 4:
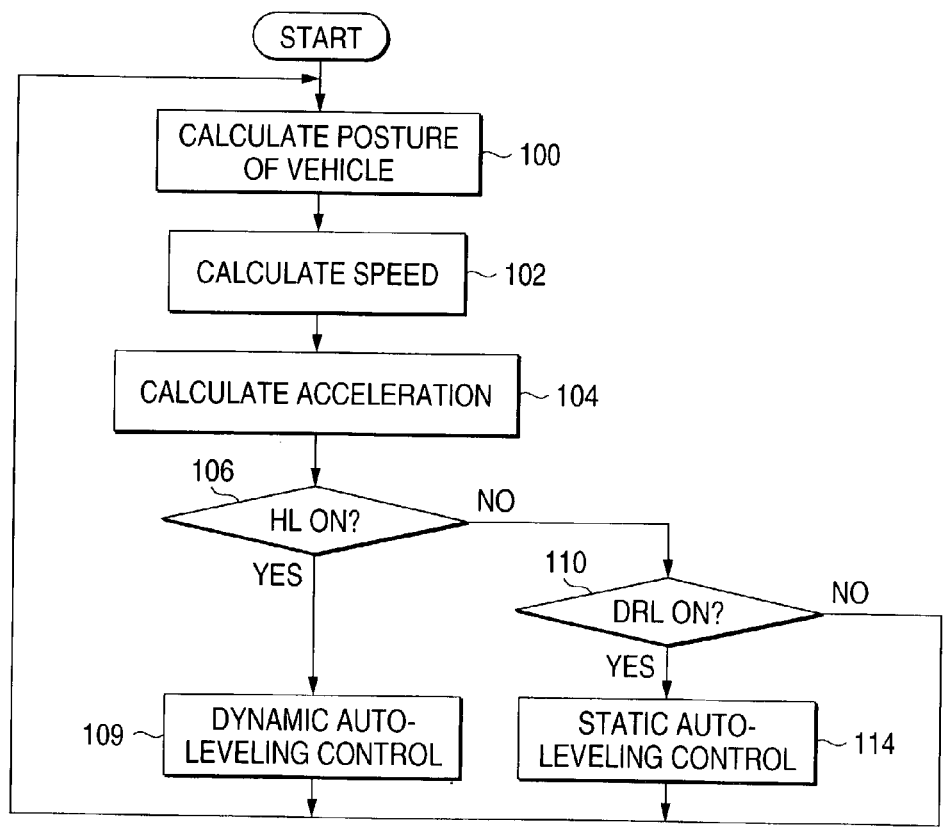
FIG. 4 is a flowchart showing controlling procedures of the same system.

FIG. 3 and FIG. 4 show a second embodiment of the present invention. FIG. 3 is a view showing an overall configuration of a auto-leveling system for vehicle headlamp as a second embodiment of the present invention. FIG. 4 is a flowchart showing controlling procedures of the same auto-leveling system for vehicle headlamp.

In the auto-leveling system in the above first embodiment, the dynamic auto-leveling specification or the static auto-leveling specification is applied. In this second embodiment, the dynamic auto-leveling process is executed in the nighttime whereas the static auto-leveling process is executed in the daytime.

In other words, in contrast to the motor that corresponds to the static auto-leveling, a drive motor 10A as an actuator that tilt and adjusts the optical axis L of the headlamp 1 is composed of a motor whose durability is considered so as to meet the dynamic auto-leveling in which the driving frequency of the motor is increased.

Also, the CPU 16 selects and executes the dynamic auto-leveling process in the nighttime, in which the headlamp 1 is turned on, based on the signals from the headlamp lighting switch 11 and the daytime running light lighting switch 21. Also, the CPU 16 selects and executes the static auto-leveling process in the daytime, in which the daytime running light is turned on. As a result, the driving frequency of the drive motor 10A as the actuator can be reduced in contrast to the case where the dynamic auto-leveling process is executed regardless of the daytime and the nighttime, and thus the load applied to the motor 10A can be reduced.

Next, particular processing procedures executed by the CPU 16 are shown in FIG. 4. The procedures different from the particular processing procedures executed by the CPU 16 in the above first embodiment (see FIG. 2) will be explained hereunder. The same symbols are affixed to the same procedures, and their redundant explanation will be omitted herein.

In step 106 that is executed via step 100 of calculating the pitch angle of the vehicle, step 102 of calculating the speed of the vehicle, and step 104 of calculating the acceleration, it is decided based on the signal from the headlamp lighting switch 11 whether or not the headlamp is turned on. Then, if YES (the headlamp lighting switch is in its ON state), the process goes to step 109. In step 109, the dynamic auto-leveling process is executed. Then, the process goes back to step 100.

In contrast, in step 106, if NO (the headlamp lighting switch is in its OFF state), the process goes to step 110. In step 110, it is decided based on the signal from the daytime running light lighting switch 21 whether or not the daytime running light DRL is turned on. Then, if YES (the daytime running light lighting switch is in its ON state), the process goes to step 114. In step 114, the static auto-leveling process is executed. Then, the process goes back to step 100. In contrast, in step 110, if NO (the daytime running light lighting switch is in its OFF state), the process goes back to step 100 to skip step 114.

In above two embodiments, the case that the dedicated daytime running light lighting switch 21 is provided separately from the headlamp lighting switch 11 is explained. If such a configuration is employed that the daytime running light DRL is automatically turned on in connection with the start of the engine, an ignition switch functions as the daytime running light lighting switch 21. Therefore, step 110 in flowcharts shown in FIGS. 2 and 4 is eliminated. Thus, if NO in step 106, the process goes directly to step 112 and step 114 in the flows respectively.

Also, in above embodiments, the auto-leveling in the moving reflector type headlamp, in which the reflector 5 is provided tiltably to the lamp body 2 that is fixed to the body of the vehicle, is explained. In this case, the present invention will be similarly applied to the auto-leveling in the moving unit type headlamp, the lamp body/reflector unit are provided tiltably to the lamp housing that is fixed to the body of the vehicle.

As apparent from the above explanation, according to first aspect of the invention, the optical axis of the headlamp is fixed/held at the frontal lower limit position during when the daytime running light is turned on, and thus the actuator of the auto-leveling system is not driven at all. Therefore, since the driving frequency of the actuator is seldom changed from that of the daytime running light unequipped vehicle, a power consumption of the auto-leveling system is not increased and also problems such as the durability of the actuator, etc. are not caused at all. As a result, the actuator for tilting and adjusting the optical axis of the headlamp, which is applied to the daytime running light unequipped vehicle, can be applied to the daytime running light equipped vehicle not to need the separate great endurance specification.

According to second aspect of the invention, the static auto-leveling process in which the driving frequency of the actuator is reduced overwhelmingly rather than the dynamic auto-leveling process is executed during when the daytime running light is turned on. Therefore, since the increase in the driving frequency of the actuator is confined to the number of times of the auto-leveling executed in the daytime running in contrast to the case of the daytime running light unequipped vehicle equipped with the auto-leveling system that executes merely the dynamic auto-leveling process, the power consumption of the auto-leveling system is not considerably increased and also problems such as the durability of the actuator, etc. are not particularly caused. As a result, the actuator for tilting/adjusting the optical axis of the headlamp, which is applied to the daytime running light unequipped vehicle, can be applied to the daytime running light equipped vehicle not to need the separate great endurance specification.

What is claimed is:

1. An auto-leveling system for vehicle headlamp comprising:
    a headlamp an optical axis of which is tilted vertically to a vehicle body by driving an actuator;
    a control unit for controlling a drive of the actuator;
    a speed sensing means for sensing a speed of a vehicle;
    a pitch angle sensing means for sensing a pitch angle of the vehicle; and
    a headlamp lighting switch, whereby the control unit controls a drive of the actuator based on the pitch angle being sensed by the pitch angle sensing means independently of whether or not a posture of the vehicle is stabilized statically such that the optical axis of the headlamp is always set to a predetermined tilted state with respect to a road surface when the headlamp lighting switch is in an ON state;
    wherein the system has a daytime running light lighting deciding function and is constructed to alternatively select a dynamic auto-leveling process, which executes a drive control of the actuator independently of whether or not the posture of the vehicle is stabilized statically, and a static auto-leveling process, which executes the drive control of the actuator as far as the posture of the vehicle is stabilized statically, wherein the vehicle is statically stabilized when it moves at a substantially constant speed or is in a stopped state, and wherein the speed and acceleration are not substantially changed during a predetermined time period and
    the control unit is constructed to select the dynamic auto-leveling process when the headlamp light switch is in an ON state, and select the static auto-leveling process when the headlamp light switch is in an OFF state and a daytime running light is turned on.

2. An auto-leveling system as claimed in claim 1, further comprising a daytime running light lighting switch connected with the control unit to realize the daytime running light lighting deciding function.

3. An auto-leveling system as claimed in claim 2, wherein said daytime running light lighting switch is functioned by an ignition switch to start an engine of the vehicle.

* * * * *